Feb. 1, 1927.

V. F. SLEZAK

SCALE BASE

Filed Aug. 2, 1926

1,616,422

Inventor
Vincent F. Slezak,
By Sturtevant & Mason
Attorneys.

Patented Feb. 1, 1927.

1,616,422

UNITED STATES PATENT OFFICE.

VINCENT F. SLEZAK, OF CHICAGO, ILLINOIS.

SCALE BASE.

Application filed August 2, 1926. Serial No. 126,670.

This invention relates to improvements in bases for automatic weighing scales.

In my copending application Serial No. 97,034, filed Mar. 24, 1926, I have disclosed an automatic weighing machine in which the weight of a person or article deposited upon a movable platform will first cause the energization of a power storage system, and thereafter produce an indication in the machine corresponding to the weight of the person or article; and upon depositing a coin within the machine, there is a release of the power stored in the first instance, whereby a ticket with such indication printed thereon is prepared by and delivered from the machine.

The present invention relates to certain improvements in the platform or base portion of such a machine, and more particularly bears upon a mechanism connected with the platform, by which the power storage is effected, the weight of the person or article determined in a continuous progression and without the employment of latches, and thereby with the elimination of any noise which may accompany the employment of such latches.

Another feature of this invention is that the power-storing and power-releasing system and the weight-determining system act independently of each other, so that there is produced, in succession, a positive storing of power, and then a positive and accurate weighing.

Figure 1:
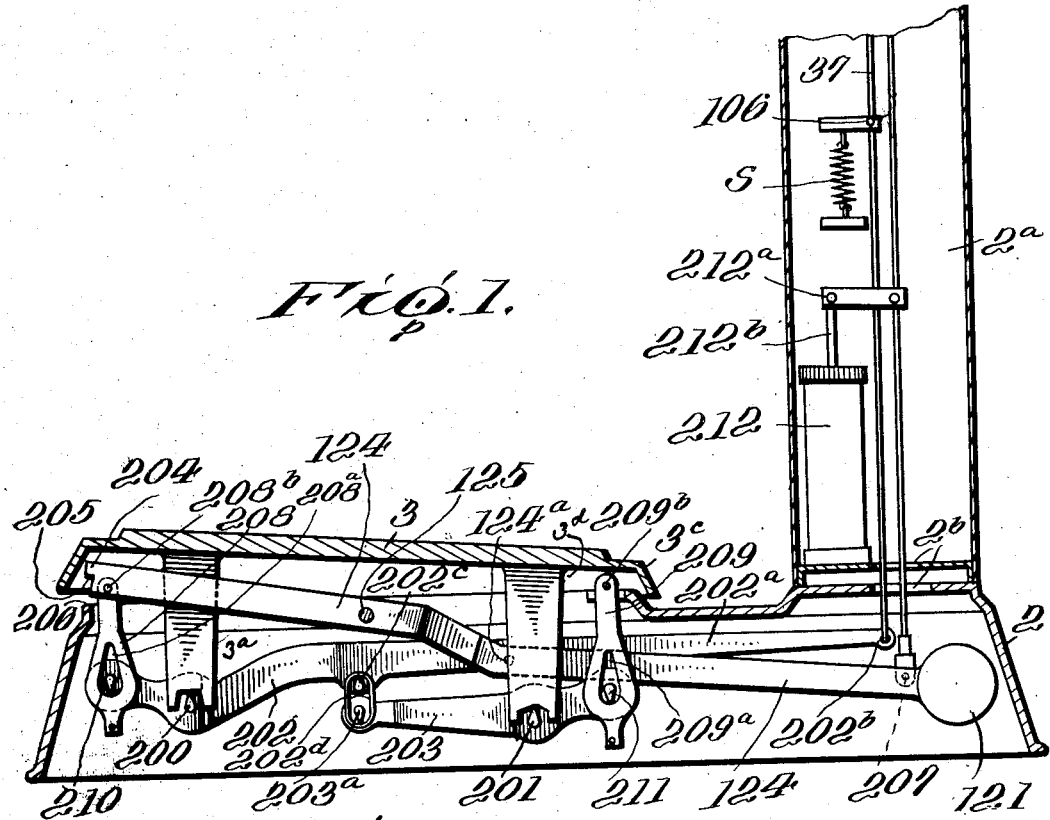

With these and other objects in view, as will appear in the course of the following specification and claims, there is shown on the accompanying drawing:

Fig. 1, a vertical sectional view through the base and part of the column of a weighing machine of the aforesaid type.

Figure 2:
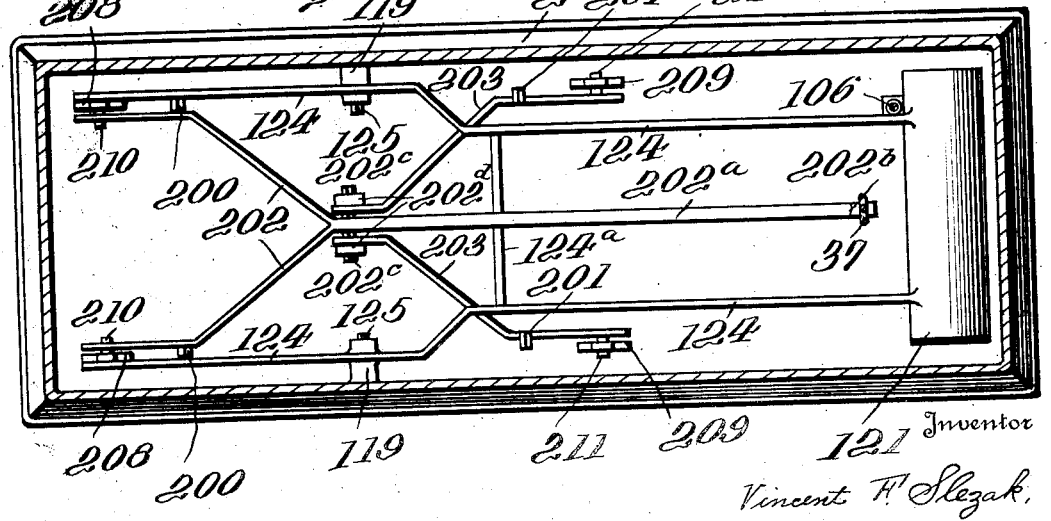

Fig. 2, a horizontal sectional view through the base of the machine with the platform removed, and with parts of the base broken away for clearness of the disclosure.

According to the present invention, a stationary base is provided with an upstanding column secured immovably thereto. A movable platform is provided above the base and is provided with means to engage a system of levers whereby in the first instance, a power-storing system is energized when a weight is superimposed upon the platform, and thereafter, in the second instance, the weight superimposed upon the platform is caused to deliver an indication proportionate to its own amount, by an independent transmission system.

In the drawings, the hollow stationary base 2 has a rigid hollow column $2^a$ fastened fixedly thereto: the base and column have their internal chambers in communication with each other through alined apertures $2^b$.

A power-storage frame including the levers 124 is mounted by the pivots 125 on the integral lugs 119 at either side of the base, as shown in Fig. 2. At the rear end (to the right in Figs. 1 and 2) the power storing levers 124 are connected by a counterweight 121, and a bridge member $124^a$ connects the two levers together intermediate their lengths: the two levers at all times move and act together. At their forward end the levers are respectively connected by the pivots $208^b$ to the suspension loop members 208. These loop members have the slots $208^a$ therein to receive the knife edges 210 of the weighing levers 202. The weighing levers 202 are united beneath the platform of the scale and extend rearwardly as a single lever arm $202^a$ to a position beneath the aperture $2^b$ to form a weighing frame. At an intermediate point of this arm $202^a$, and preferably near the junction of the two levers 202, the lever arm $202^a$ is provided with an upturned knife edge $202^c$, which receives the auxiliary loops $202^d$, one at each side of the lever $202^a$. The auxiliary weighing levers 203 have at one end the downwardly directed knife edges 211, which are received in the slots $209^a$ of the suspension loop members 209, which are mounted by pivots $209^b$ upon the base 2. The front ends of the auxiliary weighing levers are bent toward each other, and carry a knife edge $203^a$ which is in substantial vertical alinement with the knife edge $202^c$ on the weighing levers 202 and located within the auxiliary suspension loops $202^d$, so that a torque upon the auxiliary weighing levers 203 is transmitted to the weighing arm $202^a$.

Integral depending fingers $3^a$ and $3^d$ are located in pairs on the bottom of the platform 3 and have notches at their lower ends to accommodate the upwardly directed knife edges 200 and 201 respectively mounted on the weighing levers 202 and 203.

The levers 124 each have a notch at the front ends thereof to form shoulders 205 in cooperative relation to the edge 206 of the base 2, for the purpose to be set forth hereinafter.

A pivotal connection 207 on the rear end of one lever 124 connects these levers with the thrust rod 106 of the power-storing system, and is intended to effect the storage of power in the machine during the upward movement of this thrust rod 106, for the purpose and in substantially the manner set forth in my copending application Serial No. 97,034 above referred to. In order to prevent a movement of this rod with too great a speed, as for instance when a person jumps upon the platform, the bracket arm 212$^a$ is fixedly secured to the thrust rod 106, and to the piston rod 212$^b$ of a dash pot 212, so that the latter will limit the speed of movement of the thrust rod 106 in the upward direction.

The rear end of the weighing lever 202$^a$ is likewise pivotally connected at its end 202$^b$ with the weighing link 37, which corresponds to the link set forth in my aforesaid copending application and is actuated in proportion to the weight on the platform, and serves during a downward movement thereof to actuate a weight indicating device in proportion to its own movement. The aforesaid application is referred to for a full disclosure of a mechanism for such purpose.

The method of operation of the present device is as follows: When a weight is superimposed upon the platform 3, as when a person steps thereon, the platform at first tends to rock about the knife edges 201 as a fulcrum, thus pushing downward by the feet 3$^a$ upon the knife edges 200, and the weighing levers 202, rock freely downward at their front ends about the connection 202$^b$, and draw with them the loops 208, thus pulling downward on the front end of the levers 124, and raising the counterweight 121 at the rear end thereof, and causing an upward movement of the power-storing thrust rod 106, for the purpose and to the intent set forth in the copending application above referred to. This movement of the lever 124 continues until the shoulders 205 encounter the cooperating edge 206 on the rim of the base 2, whereupon the levers 124 are held in position against any further downward movement. During this time, the platform has rocked from the position shown in Fig. 1, in which it is inclined slightly downward and toward the rear, into a substantial horizontal position, with little or no actuation of the weighing link 37. The movements of the weighing levers 202 and 203 is compensated by the movement of weighing lever arm 202$^a$ about the pivot 202$^b$.

The weighing operation now proceeds with accuracy by the engagement of the depending fingers 3$^a$ upon the knife edges 200, and by the depending fingers 3$^d$ upon the knife edges 201. The front end of the levers 202 are held immovable in the loops 208 which are now suspended from the stationary pivots 208$^b$; and the weighing levers 203 are acted upon from their knife edges 201, as they hang suspended on the loop members 209 which are pivoted at the stationary pivots 209$^b$. It will be understood that the ratios of the lever arms 211—201 to 211—203$^a$, 210—200 to 219—202$^b$ are so calculated with respect to each other, that the total weight upon the platform 3, as transmitted by the several feet 3$^a$ and 3$^b$, will act at the rearward end of the lever 202$^a$ to cause a downward movement of this lever, in proportion thereto, so that the movement of the weighing link 37 and the weighing spring S connected therewith during this second phase is an accurate indication of the weight superimposed upon the platform 3, regardless of whether these members have been moved during the first phase or not.

It is preferred, however, that no substantial movement of the weighing link 37 shall occur during the first phase, so that the power storage proceeds to completion entirely independently of the weighing and prior to the initiation of the weighing.

It will be noted that this effect is accomplished without the employment of latches or auxiliary members of like type, but with a positive and successive actuation of the several elements.

When the weight is removed from the platform 3, the counterweight 121 causes the levers 124 to rock clockwise about their pivots 125, thus pulling upward upon the loop members 208, to raise the front end of the platform scale to its former inclined position. At the same time, the weighing springs S within the column 2$^a$, as described and shown in my aforesaid copending application, will pull upward on the weighing link 37, thus returning the weighing levers 202, 202$^a$ to their initial position, and together therewith the depending members 3$^a$ and 3$^b$, with the auxiliary weighing links 203.

The invention is obviously not limited to the embodiment and application shown and described, but may be modified within the scope of the appended claims.

I claim:

1. In a device of the class described, a base, a power storing mechanism including a member movable with regard to said base, a weighing mechanism including an element connected to and movable with said member, a weight receiving device and a weight indicating means, and a stop on said base to limit the movement of said member, whereby the presence of a weight upon said device will cause an initial movement of said member and said element to store up power substantially without operative movement of said indicating means and thereafter a movement of said element alone to effect an operation of said indicating means.

2. In a device of the class described, a base; a power storing mechanism including a member movable with said base and means to restore said member from actuated position; a weighing means including an element connected to and movable with said member, a weight receiving device, a weight indicating means, and a weighing spring; a stop on said base to limit the movement of said member, so that the presence of a weight upon said device will cause an initial movement of said member and said element to store that power and thereafter a movement of said element alone to effect an operation of said weight indicating means under the control of said spring, and so that the removal of the weight from said device will cause said element to be restored to original position by the weighing spring and said member to be restored by said restoring means.

3. In a device of the class described, a base, a power-storing lever pivoted on said base, a main weighing lever pivotally suspended at one end from said power-storing lever and at the other end from the weighing link of the said device whereby to actuate the same, an auxiliary weighing lever pivotally suspended at one end from said base and at the other end from said main weighing lever, a fixed stop to limit the rocking movement of said power-storing lever under actuation from said main weighing lever, and a platform mounted on said main and auxiliary weighing levers intermediate their ends whereby to actuate the same.

4. In a device of the class described, a support, a movable power storing device mounted on said support, a stop on said support, a weighing link, a mass-actuated mechanism mounted on said device and adapted to move the same into contact with said stop so that said device will store up energy, and a connection between said mechanism and said link so that said mechanism may move without substantial actuation of said link during the movement of said device, said mechanism acting after engagement of said device with said stop to actuate said link in proportion to the weight of the mass thereon.

5. In a device of the class described, a base, a power storing frame pivoted to said base, means to normally hold said frame in a rest position and to return it thereto after actuation, a weighing frame pivotally mounted at one end on said power frame and connected at its other end to the weight indicating means, an auxiliary weighing lever pivotally mounted at one end on the base and connected at its other end to said weighing frame, a weight receiving platform, means for pivotally supporting said platform on said weighing frame and lever intermediate their ends, and a stop on said base to limit the movement of said power frame when a weight is placed upon said platform, so that said weighing frame and lever initially actuate and move with said power frame whereby said frame will store up power and thereafter said weighing frame will be moved in proportion to the weight on said platform and independently of said power frame.

In testimony whereof, I affix my signature.

VINCENT F. SLEZAK.